US012332749B1

(12) United States Patent
Wald et al.

(10) Patent No.: US 12,332,749 B1
(45) Date of Patent: Jun. 17, 2025

(54) DATABASE BACKUP AND RECOVERY STRATEGY OPTIMIZATION

(71) Applicant: International Business Machines Corporation, Armonk, NY (US)

(72) Inventors: Barbara Wald, Weil im Schoenbuch (DE); Stefan Schmitt, Holzgerlingen (DE); Ephraim Petry, Stuttgart (DE); Oliver Rau, Pirmasens (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/795,237

(22) Filed: Aug. 6, 2024

(51) Int. Cl.
G06F 11/14 (2006.01)
G06F 11/34 (2006.01)

(52) U.S. Cl.
CPC ...... *G06F 11/1466* (2013.01); *G06F 11/1464* (2013.01); *G06F 11/1469* (2013.01); *G06F 11/3419* (2013.01); *G06F 2201/80* (2013.01)

(58) Field of Classification Search
None
See application file for complete search history.

(56) References Cited

U.S. PATENT DOCUMENTS

| | | | |
|---|---|---|---|
| 9,430,335 B2 | 8/2016 | Jin et al. |
| 9,722,886 B2 | 8/2017 | Anderson et al. |
| 9,792,180 B2 | 10/2017 | Lin |
| 10,013,313 B2 | 7/2018 | Zhang et al. |
| 10,083,095 B1 | 9/2018 | Chopra et al. |
| 10,210,054 B1 | 2/2019 | Mehrotra et al. |
| 10,747,625 B2 | 8/2020 | Gaschler et al. |
| 10,754,729 B2 | 8/2020 | Mehta et al. |
| 11,461,186 B2 | 10/2022 | Klus et al. |
| 2004/0039727 A1 | 2/2004 | Dessloch et al. |

(Continued)

FOREIGN PATENT DOCUMENTS

| | | |
|---|---|---|
| CN | 103154901 B | 3/2016 |
| DE | 112011103378 B4 | 1/2021 |
| EP | 2597579 A1 | 5/2013 |

OTHER PUBLICATIONS

Anonymous, "System method and apparatus to predict the best restore mechanism for over-cloud infrastructure by heuristic analysis," Jan. 6, 2016, An IP.com Prior Art Database Technical Disclosure, IP.com No. IPCOM000244701D, 11 pages.

(Continued)

*Primary Examiner* — Eddy Cheung
(74) *Attorney, Agent, or Firm* — CANTOR COLBURN LLP; Teddi Maranzano

(57) ABSTRACT

Computer-implemented methods for optimizing a backup and recovery strategy of a database are provided. Aspects include obtaining service level agreements for the database, identifying an initial recommended database backup and recovery strategy for the database based on the service level agreements, and configuring a database backup of the database based on the initial recommended database backup and recovery strategy. Aspects also include monitoring a usage of one or more of the database and the database backup, identifying a recommended change to the configuration of the database backup based on the usage of one or more of the database and the database backup, and updating the configuration of the primary database based on the recommended change.

20 Claims, 6 Drawing Sheets

(56) References Cited

U.S. PATENT DOCUMENTS

| | | | |
|---|---|---|---|
| 2012/0089572 A1 | 4/2012 | Raichstein et al. | |
| 2013/0262393 A1 | 10/2013 | Mrak et al. | |
| 2019/0155695 A1 | 5/2019 | Protasov et al. | |
| 2020/0042398 A1* | 2/2020 | Martynov | G06F 3/067 |
| 2020/0092334 A1* | 3/2020 | Hiebert | H04L 41/0813 |
| 2020/0117365 A1* | 4/2020 | Patwardhan | G06F 3/0671 |
| 2021/0056001 A1 | 2/2021 | Dwarampudi et al. | |
| 2021/0117287 A1* | 4/2021 | Zhang | H04L 41/5006 |
| 2021/0349785 A1 | 11/2021 | Klus et al. | |
| 2024/0296098 A1* | 9/2024 | Phatak | G06F 11/1451 |

OTHER PUBLICATIONS

Linkedin, "Your database backup and recovery strategy is outdated. How can you modernize it?" https://www.linkedin.com/advice/0/your-database-backup-recovery-strategy-outdated-mc8xf (Retrieved Apr. 22, 2024): 10 Pages.

Nikolow et al., "Policy-based SLA storage management model for distributed data storage services." Computer Science 19 (2018): pp. 405-432.

Ramesh et al., "A secured database monitoring method to improve data backup and recovery operations in cloud computing." BOHR International Journal of Computer Science 2.1 (2022): pp. 17-23.

Sahri et al. "DBaaS-expert: A recommender for the selection of the right cloud database." International Symposium on Methodologies for Intelligent Systems. Cham: Springer International Publishing, (2014): pp. 315-324.

\* cited by examiner

DATABASE BACKUP AND RECOVERY STRATEGY OPTIMIZATION

BACKGROUND

The present disclosure generally relates to database storage and operations, and more specifically, to optimizing a backup and recovery strategy of a database.

Most, if not all, organizations that store data in databases backup their databases to provide data protection, to provide business continuity, to meet compliance requirements, to provide disaster recovery, and the like. In today's complex computing environments, there are a wide variety of different database backup and recovery strategies that can be utilized to backup a database and recover data from the backed-up database. In addition, each of the different backup and recovery strategies may include a wide variety of operational parameters that can be set by a database administrator, which can affect the performance and cost of the backup and recovery strategies.

Database administrators often utilize a set of organizational polices, referred to herein as service level agreements (SLAs), that define a set of standards for data storage and recovery for their organization when selecting a database backup and recovery strategy for a particular database. However, these SLAs often do not provide enough information for the database administrator to select an optimal backup and recovery strategy or to set the operational parameters that are required when setting up a backup and recovery strategy of a database.

SUMMARY

Embodiments of the present disclosure are directed to computer-implemented methods for optimizing a backup and recovery strategy of a database. According to an aspect, a computer-implemented method includes obtaining service level agreements for the database, identifying an initial recommended database backup and recovery strategy for the database based on the service level agreements, and configuring a database backup of the database based on the initial recommended database backup and recovery strategy. The method also includes monitoring a usage of one or more of the database and the database backup, identifying a recommended change to the configuration of the database backup based at least in part on one or more of a change in the usage of one or more of the database and the database backup, a change in the service level agreements, a change in a cloud environment in which the database backup is located, and a change in available database backup and recovery strategies offered by the cloud environment, and updating the configuration of the primary database based on the recommended change.

Embodiments also include computing systems and computer program products for optimizing a backup and recovery strategy of a database Additional technical features and benefits are realized through the techniques of the present disclosure. Embodiments and aspects of the disclosure are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the present disclosure are apparent from the following detailed description taken in conjunction with the accompanying drawings in which:

DETAILED DESCRIPTION

Figure 1:
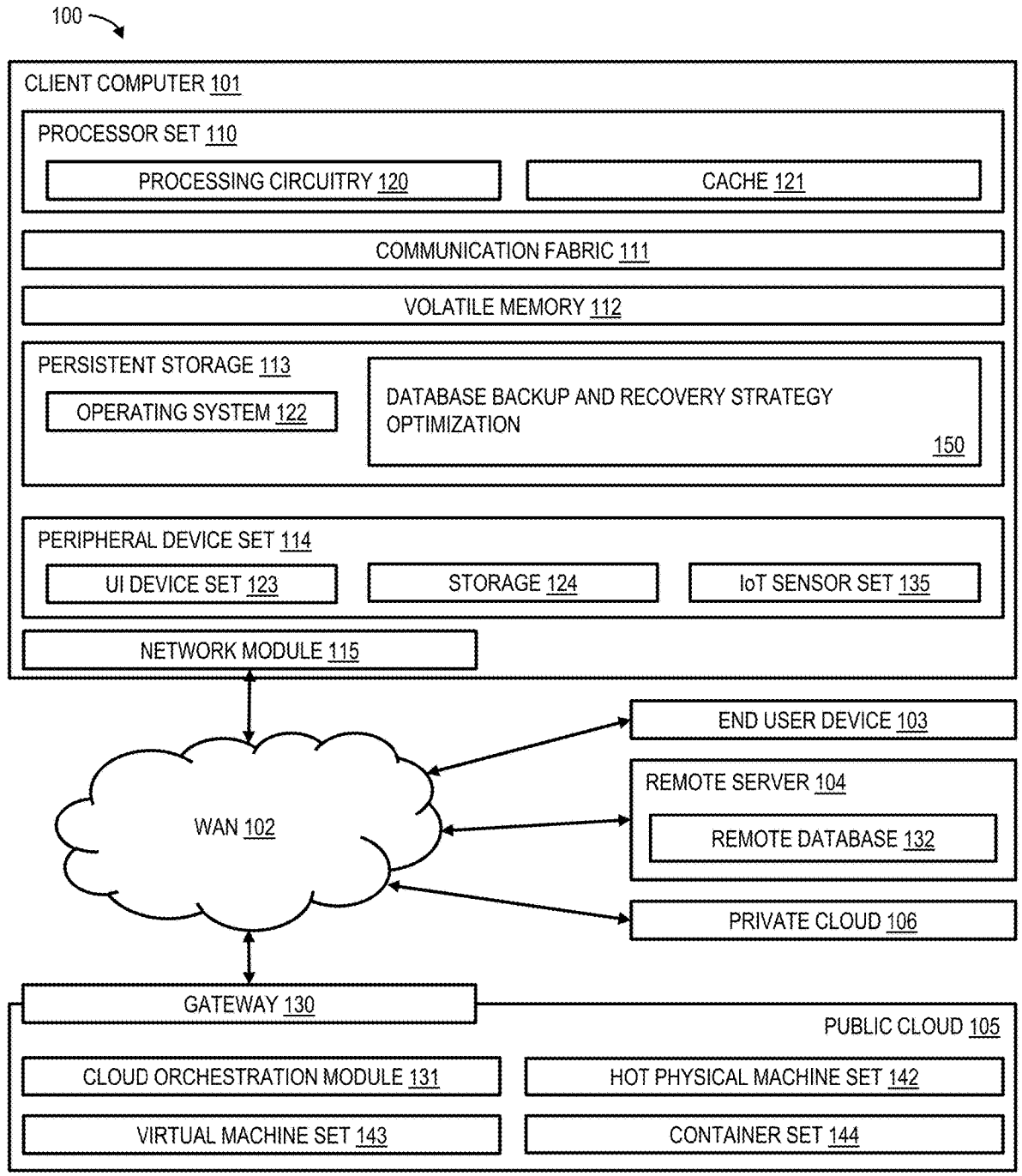
FIG. 1 depicts a block diagram of an example computer system for use in conjunction with one or more embodiments of the present disclosure.

As described above, database administrators often lack sufficient information to select an optimal backup and recovery strategy for a database or to set the operational parameters that are required when setting up a backup and recovery strategy of a database. In many cases, database administrators, also referred to herein as clients, are overwhelmed when they are asked to choose a backup strategy for a given database as they do not have the expert knowledge on implications of the choice, e.g. the recovery time, regional disasters, remote backups, hybrid backups, and the like. In addition, for cloud-based database backups, the cloud providers lack the information regarding the database usage patterns and non-functional requirements that are needed for selecting the optimal backup and recovery strategy for a cloud-based database backup.

In exemplary embodiments, systems, methods, and computer program products for optimizing a backup and recovery strategy of a database are provided. In exemplary embodiments, a cloud environment includes a backup strategy optimization module that is configured to determine an optimal backup and recovery strategy for a database and to provide the optimal backup and recovery strategy to a database administrator with the optimal backup strategy for the database. In one embodiment, the backup strategy optimization module receives a set of service level agreements (SLAs) from a database administrator and determines an initial backup and recovery strategy for the database based on the SLAs.

In exemplary embodiments, the backup strategy optimization module is configured to monitor the usage pattern of the database and to update the optimal backup and recovery strategy for the database based on the usage pattern of the database. In addition, the backup strategy optimization module is configured to gather feedback about the suggested database backup and recovery strategies and to learn from past decisions and experiences in order to improve the quality of the backup and recovery strategy recommendations. In exemplary embodiments, the backup strategy optimization module is configured to access and utilize a knowledge base about backup and recovery strategies utilized by a large number of databases and the corresponding SLAs for each of the databases.

Various aspects of the present disclosure are described by narrative text, flowcharts, block diagrams of computer systems, and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as optimizing a backup and recovery strategy of a database design as shown at block 150. In addition to block 150, computing environment 100 includes, for example, computer 101, wide area network (WAN) 102, end user device (EUD) 103, remote server 104, public Cloud 105, and private Cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI), device set 123, storage 124, and Internet of Things (IoT) sensor set 125), and network module 115. Remote server 104 includes remote database 132. Public Cloud 105 includes gateway 130, Cloud orchestration module 131, host physical machine set 142, virtual machine set 143, and container set 144.

COMPUTER 101 may take the form of a desktop computer, laptop computer, tablet computer, smart phone, smart watch or other wearable computer, mainframe computer, quantum computer, a small single board computer (e.g. a Raspberry Pi) or any other form of computer or mobile device now known or to be developed in the future that is capable of running a program, accessing a network or querying a database, such as remote database 132. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a Cloud, even though it is not shown in a Cloud in FIG. 1. On the other hand, computer 101 is not required to be in a Cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collects and store helpful and useful data for use by other computers, such as computer 101. For example, in a hypothetical case where computer 101 is designed and programmed to provide a recommendation based on historical data, then this historical data may be provided to computer 101 from remote database 132 of remote server 104.

PUBLIC CLOUD 105 is any computer system available for use by multiple entities that provides on-demand availability of computer system resources and/or other computer capabilities, especially data storage (Cloud storage) and computing power, without direct active management by the user. Cloud computing typically leverages the sharing of resources to achieve coherence and economies of scale. The direct and active management of the computing resources of public Cloud 105 is performed by the computer hardware and/or software of Cloud orchestration module 131. The computing resources provided by public Cloud 105 are typically implemented by virtual computing environments that run on various computers making up the computers of host physical machine set 142, which is the universe of physical computers in and/or available to public Cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after the instantiation of the VCE. Cloud orchestration module 131 manages the transfer and storage of images, deploys new instantiations of VCEs, and manages active instantiations of VCE deployments. Gateway 130 is the collection of computer software, hardware, and firmware that allows public Cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public Cloud 105, except that the computing resources are only available for use by a single enterprise. While private Cloud 106 is depicted as being in communication with WAN 102, in other embodiments a private Cloud may be disconnected from the internet entirely and only accessible through a local/private network. A hybrid Cloud is a composition of multiple Clouds of different types (for example, private, community, or public Cloud types), often respectively implemented by different vendors. Each of the multiple Clouds remains a separate and discrete entity, but the larger hybrid Cloud architecture is bound together by standardized or proprietary technology that enables orchestration, management, and/or data/application portability between the multiple constituent Clouds. In this embodiment, public Cloud 105 and private Cloud 106 are both part of a larger hybrid Cloud.

Figure 2:
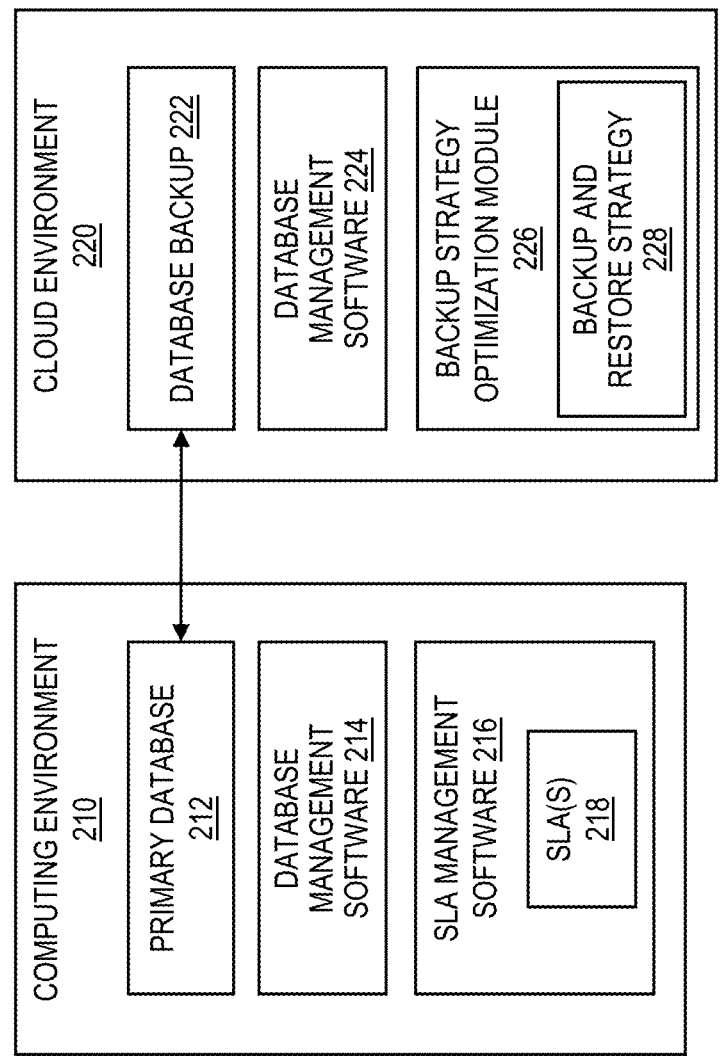
FIG. 2 depicts a block diagram of a system for optimizing a backup and recovery strategy of a database in accordance with one or more embodiments of the present disclosure.

Referring now to FIG. 2, a block diagram of a system 200 for optimizing a backup and recovery strategy of a database in accordance with one or more embodiments of the present disclosure is shown. In exemplary embodiments, the system 200 includes a computing environment 210 and a cloud environment 220. In one embodiment, the computing environment 210 may be separate from the cloud environment 220. In another embodiment, the computing environment 210 may be a part of the cloud environment 220. In exemplary embodiments, the cloud environment 220 may be embodied in one of a public cloud 105 or a private cloud 106 such as those shown in FIG. 1.

The computing environment 210 includes a primary database 212, database management software 214, and service level agreement (SLA) management software 216. In exemplary embodiments, the primary database 212 is utilized to store information or data and the database management software 214 is configured to manage the primary database 212. The database management software 214 may employ a backup and recovery strategy to backup data from the primary database 212 to a database backup 222, which is stored in the cloud environment 220. In exemplary embodiments, the database management software 214 is configured to monitor the performance of the primary database 212. For example, the database management software 214 is configured to monitor one or more of the throughput, the latency, workload characteristics, the response time, the concurrency, the resource utilization, the error rate, a cache hit ration, a size, and the availability of the primary database 212. In addition, other metrices including restore time, time until the database is up and running again after a disaster, number of logs to be applied after restore, log location, costs, environmental footprint, and the like may be monitored by the database management software 214.

In exemplary embodiments, the SLA management software 216 includes a set of service level agreements (SLAs) 218 for the primary database 212 and the database backup 222 and the SLA management software is configured to monitor the primary database 212 and the database backup 222 to ensure that the primary database 212 and the database backup 222 comply with the corresponding SLAs 218. In exemplary embodiments, the SLAs for the primary database 212 and the database backup 222 can include, but are not limited to, a query response time of the primary database 212 and/or the database backup 222, a recovery time for the database backup 222, a limit on a physical location of the servers that support the primary database 212 and/or the database backup 222, a security level of the primary database 212 and/or the database backup 222, a redundancy provided by the database backup 222, the availability of the primary database 212 and/or database backup 222, one or more environmental considerations, for example a minimum percentage of green energy that is utilized by the primary database 212 and/or database backup 222.

In exemplary embodiments, cloud environment 220 includes the database backup 222, database management software 224, and a backup strategy optimization module 226. The database management software 224 may employ a backup and recovery strategy to backup data from the primary database 212 to a database backup 222. In exemplary embodiments, the database management software 224 is configured to monitor the performance of the database backup 222. For example, the database management software 214 is configured to monitor one or more of, the latency, workload characteristics, the response time, the concurrency, the resource utilization, the error rate, a cache hit ration, a size, and the availability of the database backup 222.

In exemplary embodiments, the backup strategy optimization module 226 is configured to recommend an initial backup and restore strategy for the primary database 212, which is used to configure the database backup 222. In one embodiment, the backup strategy optimization module 226 is configured to identify a backup and restore strategy 228 for the primary database 212 based at least in part on the SLAs 218 for the primary database 212. In exemplary embodiments, the backup and restore strategy 228 for a database includes, but is not limited to, a physical location of the servers that store the data for the database backup 222, a type of data storage system used for the database backup 222 (i.e., filesystem, disk, tape, etc.), distribution and/or collocation patterns, and the scheduling of backups and archives. For example, is the primary database 212 backed up at fixed time intervals such as the end/start of a week/month, one per day, or on a variable interval that is dependent on number of transactions. The backup and restore strategy 228 for a database also can include the granularity of the primary database 212 that is backed up at any given interval. For example, is the entire primary database 212 backed up at each interval, is a data log backed up at some intervals. The backup and restore strategy 228 for a database also can include backup and restore permissions that limit who can initiate backup or restore. The backup and restore strategy 228 for a database also can include a backup method (i.e., filesystem snapshot, disk snapshot, database utilities, migration of data to off-site storage, continuous data replication, and the like). The backup and restore strategy 228 for a database also can include backup use cases such as disaster recovery, disk failure, filesystem corruption, and logical errors in database.

In exemplary embodiments, the backup strategy optimization module 226 is also configured to obtain performance data for the primary database 212 and/or the database backup 222 and to recommend changes to the backup and restore strategy 228 for the primary database 212 based on the performance data. For example, the backup and restore strategy 228 for the primary database 212 may include hourly backup and application of a transaction log of the primary database 212 to the database backup 222. However, based on a determination by the backup strategy optimization module 226 that the write activity of the primary database 212 has changed such that updates are only written once per day to the primary database 212, the backup strategy optimization module 226 may recommend a change to the backup and restore strategy 228 for the primary database 212 that changes the frequency from hourly backups to daily backups.

In addition, the backup strategy optimization module 226 is configured to obtain changes to the SLAs 218 and to recommend changes to the backup and restore strategy 228 for the primary database 212 based on the changes to the SLAs. For example, the SLA 218 may specify that the servers that store the database backup 222 must be located within a specific country and the SLA 218 may be changed to include additional acceptable storage locations. Based on detecting the change in the SLA 218, the backup strategy optimization module 226 may recommend migrating the database backup 222 to a less expensive or faster physical location that still complies with the SLA 218.

In exemplary embodiments, the backup strategy optimization module 226 is configured to utilize one or more machine learning technologies to generate an initial recommended the backup and restore strategy 228 for the primary database 212 and to generate recommended changes to the backup and restore strategy 228 for the primary database 212 based on changes to the operation of the primary database 212 and/or changes to the SLAs 218 of the primary database 212. In one embodiment, the backup strategy optimization module 226 is configured to utilize a machine learning training and inference system 600 such as the one shown in FIG. 6 to generate an initial recommended the backup and restore strategy 228 for the primary database 212 and to utilize a reinforcement learning system to generate recommended changes to the backup and restore strategy 228 for the primary database 212 based on changes to the operation of the primary database 212 and/or changes to the SLAs 218 of the primary database 212.

Figure 3:
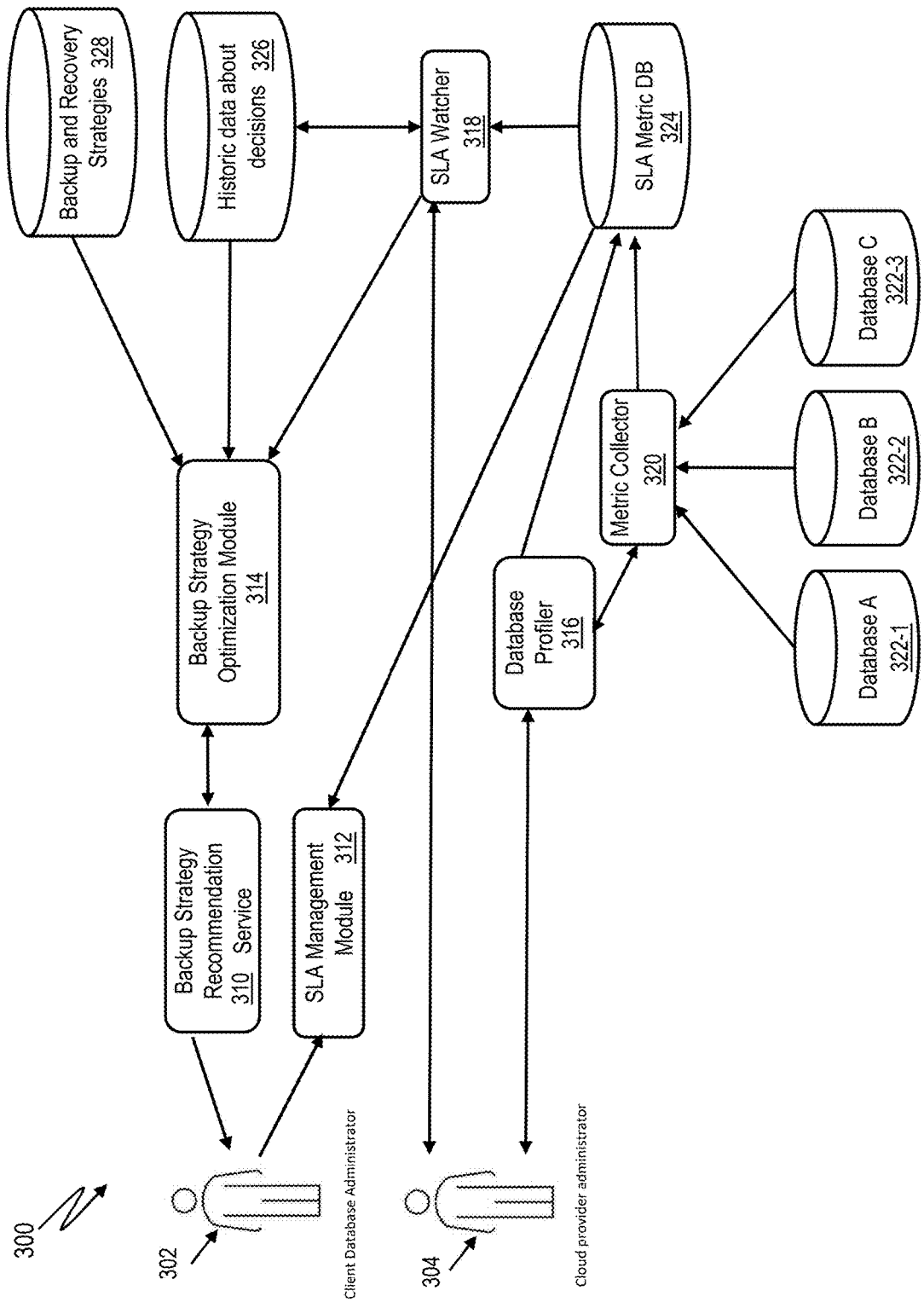
FIG. 3 depicts a block diagram of a system for optimizing a backup and recovery strategy of a database in accordance with one or more embodiments of the present disclosure.

Referring now to FIG. 3, a block diagram of a system 300 for optimizing a backup and recovery strategy of a database in accordance with one or more embodiments of the present disclosure is shown. In exemplary embodiments, the system 300 includes a client database administrator 302 that manages a primary database, such as the primary database 212 shown in FIG. 2, and a cloud provider administrator 304 that manages a cloud environment, such as the cloud environment 220 shown in FIG. 2.

In exemplary embodiments, the system 300 includes a backup strategy recommendation service 310 and an SLA management module 312, both of which are configured to interact with the client database administrator 302. In exemplary embodiments, the SLA management module 312 is configured to receive one or more SLAs from the client database administrator 302 and may also be configured to monitor compliance with the SLAs. The backup strategy recommendation service 310 is configured to provide the client database administrator 302 with recommended backup and restore strategies for the database managed by the client database administrator 302 and to transmit the responses received from the client database administrator 302 to a backup strategy optimization module 314. In exemplary embodiments, the backup and recovery strategies that are available on the cloud environment are stored in a database 328, which the backup strategy optimization module 314 is configured to access.

In exemplary embodiments, the system 300 includes a database profiler 316 that is configured to identify patterns by analyzing a set of databases 322, such as database A 322-1, database B 322-2, and database C 322-3. In exemplary embodiments, the system 300 includes metrics collector 320 that collects and anonymizes meta data of databases 322 disposed in the cloud environment managed by the cloud provider administrator 304. In one embodiment, the metrics collector 320 provides the anonymized data to the database profiler 316 and stores non-anonymized data in an SLA metric database 324, which can be accessed by the SLA management module 312. In exemplary embodiments, the set of databases 322 include database backups for a plurality of different clients of the provider that utilize the cloud environment 220. Accordingly, the metrics collector 320 may collect and provide data regarding the performance metrics of different databases 322 that utilize different backup and restore strategies across multiple clients of the cloud environment 220.

In exemplary embodiments, the database profiler 316 includes a training set of data to learn to categorize the databases that are backed up to, or stored on, the cloud environment. The database profiler 316 also includes a set of test data that can be used to test the categorization of the databases that are backed up to, or stored on, the cloud environment.

Figure 6:
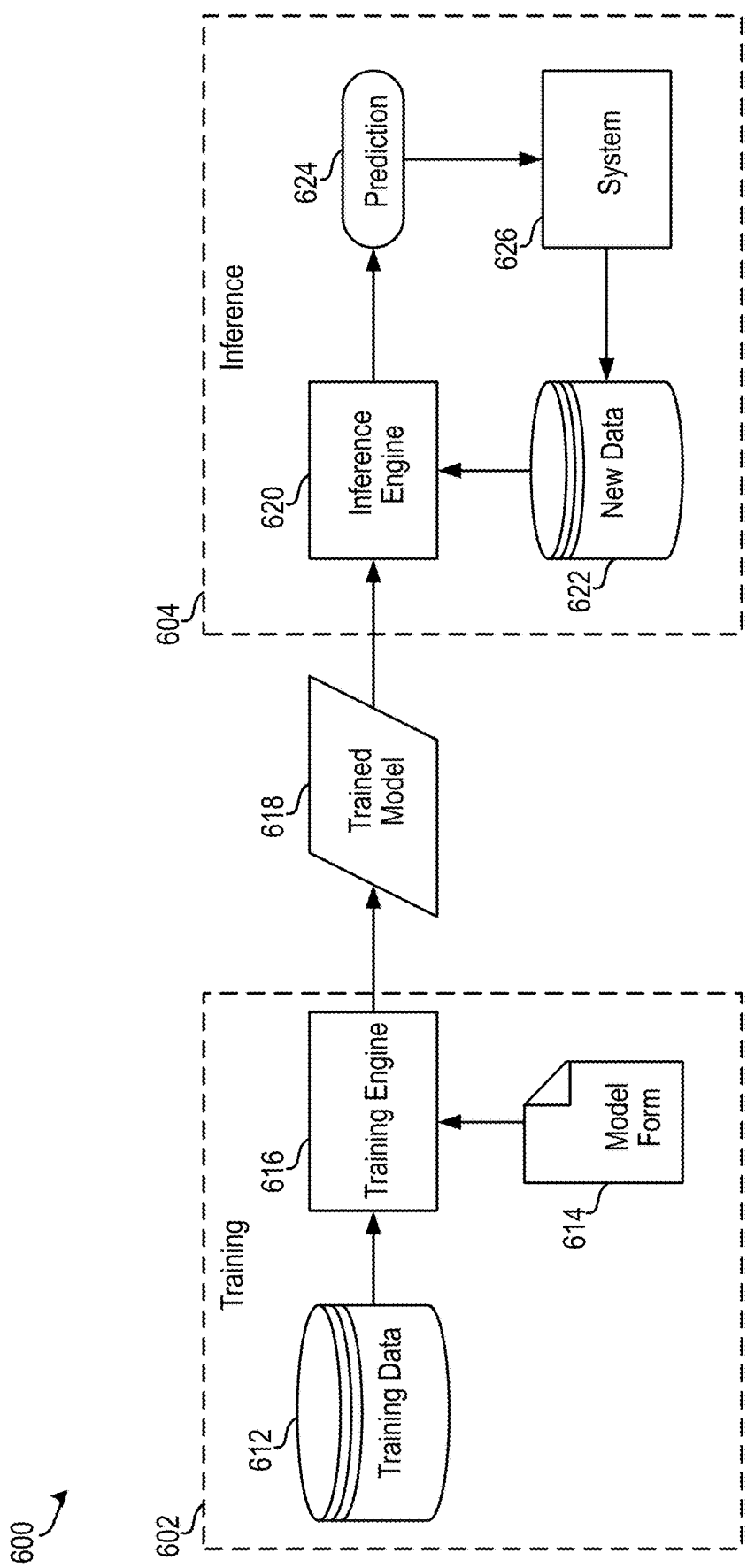
FIG. 6 is a block diagram of components of a machine learning training and inference system in accordance with one or more embodiments of the present invention.

In one embodiment, one or more of the backup strategy optimization module 314 and the database profiler 316 are configured to utilize a machine learning training and inference system 600 such as the one shown in FIG. 6 to generate an initial recommended the backup and restore strategy for the primary database. In exemplary embodiment, the machine learning training and inference system is configured to collect data from all databases 322 within a cloud environment and analyse the collected data to identify usage patterns. The machine learning training and inference system is further configured to periodically verify new test data and build clusters out of test data and to update the trained machine learning model accordingly.

In one embodiment, the backup strategy optimization module 314 and the SLA watcher 318 are configured to utilize a reinforcement learning system to generate recommended changes to the backup and restore strategy for the primary database based on changes to the operation of the primary database and/or changes to the SLAs of the primary database. The SLA watcher 318 is configured to learn how changes in the infrastructure or strategy affect behaviour based on data obtained from an SLA metric database and a historic decision database 326.

The reinforcement learning system include metrics that are utilized to determining rewards for the improvement of the operation of backing up the primary database and a set of weights that are associated with the various metrics. The reinforcement learning system also includes an optimization algorithm, such as a Monte Carlo algorithm or a Q-learning algorithm. In exemplary embodiments, the reinforcement learning system is configured to recommend a backup and recovery strategy for a database to a client database administrator. Next, the selection of the backup and recovery strategy for a database by the client database administrator is made and metrics regarding the operation of the primary database and the database backup are captured by the metrics collector 320 and reported to the SLA watcher 318. These metrics are then input into the optimization algorithm, which calculates a reward score for the performance of the backup and recovery strategy for the database. The reward score is then compared to historical data that includes previous backup and recovery strategies utilized by the primary database and the reward score associated with each. Next, based on the calculated reward score and the historical data, a change in the backup and recovery strategy for the database is recommended to the client database administrator. The reinforcement learning system iteratively repeats this process until an optimal backup and recovery strategy for the database is identified (i.e., when no recommended changes are identified for the backup and recovery strategy for the database).

Figure 4:
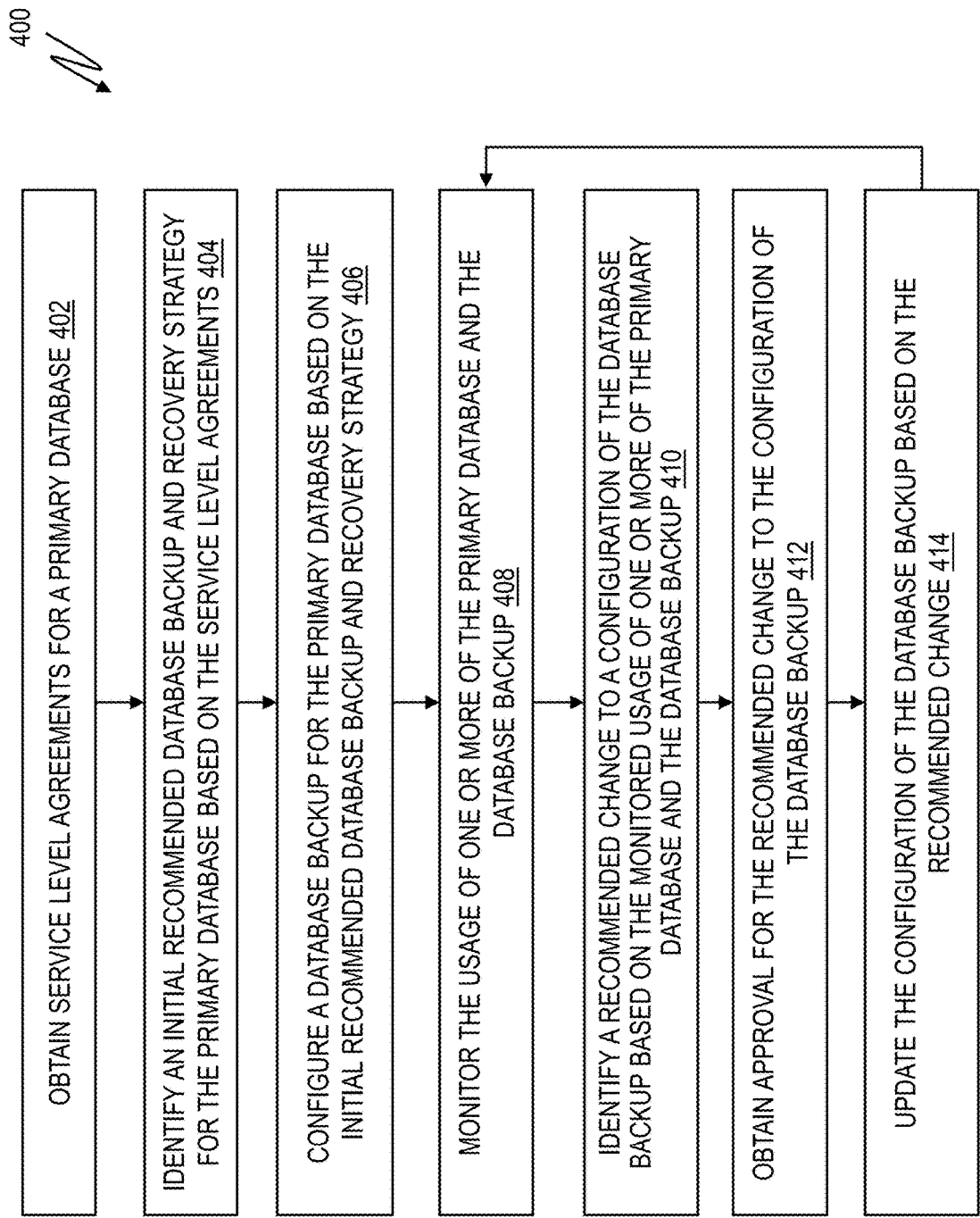
FIG. 4 depicts a flowchart of a method for configuring a system for optimizing a backup and recovery strategy of a database in accordance with one or more embodiments of the present disclosure.

Referring now to FIG. 4, a flowchart of a method 400 for configuring a system for optimizing a backup and recovery strategy of a database in accordance with one or more embodiments of the present disclosure is shown. In one embodiment, the method 400 is performed by a backup strategy optimization module 226 in the cloud environment 220, such as the one shown in FIG. 2. As shown at block 402, the method 400 includes obtain service level agreements for a primary database. In exemplary embodiments, the service level agreements can include one or more recovery time metrics, restrictions on the location of backup data, permitted storage types for the backup data, redundancy metrics for the backup data, backup frequency, restore locations, encryption requirements for backup data, and the like.

Next, as shown at block 404, the method 400 includes identifying an initial recommended database backup and recovery strategy for the primary database based on the service level agreements. In one embodiment, the initial recommended database backup and recovery strategy for the database is identified using a trained machine learning model. The trained machine learning model is created based on training data that includes service level agreements for each of a plurality of databases, current and historical backup and recovery strategies corresponding to each of the plurality of databases, and current and historical service level agreement metrics for each of the plurality of databases.

Next, as shown at block 406, the method 400 includes configuring a database backup for the primary database based on the initial recommended database backup and recovery strategy. The method 400 also includes monitoring the usage of one or more of the primary database and the database backup, as shown at block 408. Next, as shown at block 410, the method 400 includes identify a recommended change to a configuration of the database backup based on the monitored usage of one or more of the primary database and the database backup. In exemplary embodiments, the method 400 may also include identifying a change in the service level agreements for the database and identifying a change to the configuration of the database backup based on the change in the service level agreements. In exemplary embodiments, the recommended change includes a new database backup and recovery strategy that is identified by inputting the usage of the one or more of the database and the database backup, a current database backup and recovery strategy of the database, and the service level agreements for the database into a trained machine learning model. In some embodiments, other triggers can be used to determine that a change to configuration of the database backup should be made. Such triggers can include, but are not limited to, changes in the behaviour of one or more of the primary database and the database backup due to changes in the environment or a change in the database backup and recovery strategies offered by the provider.

Next, as shown at block 412, the method 400 includes obtaining approval for the recommended change to the configuration of the database backup. The method 400 concludes at block 414 by updating the configuration of the database backup based on the recommended change. In one embodiment, updating the configuration of the database backup based on the recommended change includes modifying the initial recommended database backup and recovery strategy for the database. In exemplary embodiments, monitoring the usage of one or more of the database and the database backup, identifying the recommended change to the configuration of the backup based on the usage of one or more of the database and the database backup, and the updating the configuration of the database backup based on the recommended change are iteratively repeated based on an output of a reinforcement learning algorithm.

Figure 5:
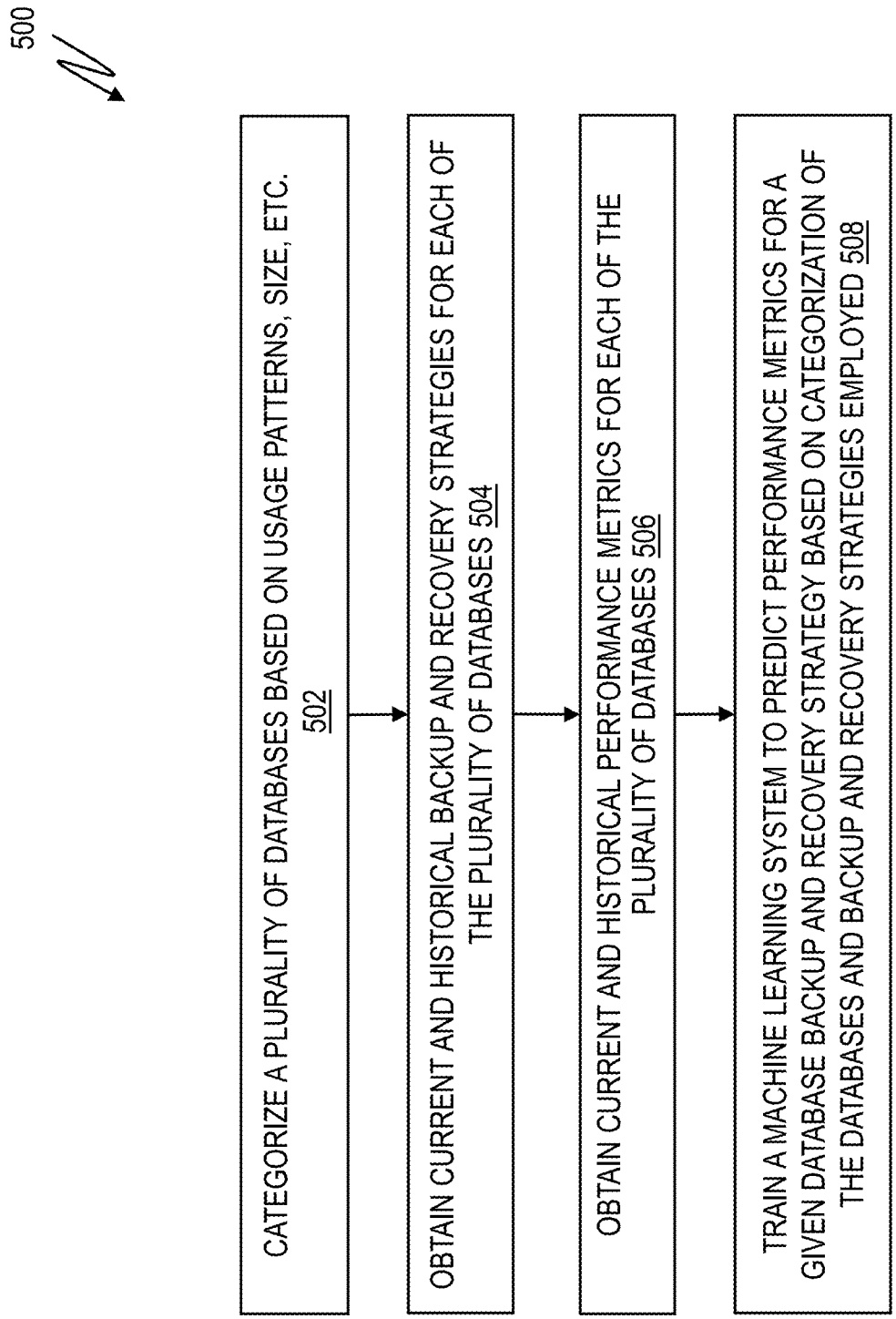
FIG. 5 depicts a flowchart of a method for optimizing a backup and recovery strategy of a database in accordance with one or more embodiments of the present disclosure.

Referring now to FIG. 5, a flowchart of a method for optimizing a backup and recovery strategy of a database in accordance with one or more embodiments of the present disclosure is shown. In one embodiment, the method 500 is performed by a backup strategy optimization module 226 in the cloud environment 220, such as the one shown in FIG. 2. As shown at block 502, the method 500 includes categorizing a plurality of databases based on usage patterns, size, etc. Next, as shown at block 504, the method 500 includes obtaining current and historical backup and recovery strategies for each of the plurality of databases. The method 500 further includes obtaining current and historical performance metrics for each of the plurality of databases. Next, as shown at block 508, the method 500 includes training a machine learning system to predict performance metrics for a given database backup and recovery strategy based on categorization of the databases and backup and recovery strategies employed.

One or more embodiments described herein can utilize machine learning techniques to perform tasks, such as identifying a backup and recovery strategy for a database based on an input service level agreement. More specifically, one or more embodiments described herein can incorporate and utilize rule-based decision making and artificial intelligence (AI) reasoning to accomplish the various operations described herein, namely identifying a backup and recovery strategy for a database based on an input service level agreement. The phrase "machine learning" broadly describes a function of electronic systems that learn from data. A machine learning system, engine, or module can include a trainable machine learning algorithm that can be trained, such as in an external cloud environment, to learn functional relationships between inputs and outputs, and the resulting model (sometimes referred to as a "trained neural network," "trained model," and/or "trained machine learning model") can be used for identifying a backup and recovery strategy for a database based on an input service level agreement, for example. In one or more embodiments, machine learning functionality can be implemented using an artificial neural network (ANN) having the capability to be trained to perform a function. In machine learning and cognitive science, ANNs are a family of statistical learning models inspired by the biological neural networks of animals, and in particular the brain. ANNs can be used to estimate or approximate systems and functions that depend on a large number of inputs. Convolutional neural networks (CNN) are a class of deep, feed-forward ANNs that are particularly useful at tasks such as, but not limited to analyzing visual imagery and natural language processing (NLP). Recurrent neural networks (RNN) are another class of deep, feed-forward ANNs and are particularly useful at tasks such as, but not limited to, unsegmented connected handwriting recognition and speech recognition. Other types of neural networks are also known and can be used in accordance with one or more embodiments described herein.

ANNs can be embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based on experience, making ANNs adaptive to inputs and capable of learning. For example, an ANN for handwriting recognition is defined by a set of input neurons that can be activated by the pixels of an input image. After being weighted and transformed by a function determined by the network's designer, the activation of these input neurons are then passed to other downstream neurons, which are often referred to as "hidden" neurons. This process is repeated until an output neuron is activated. The activated output neuron determines which character was input. It should be appreciated that these same techniques can be applied in the case of identifying a backup and recovery strategy for a database based on an input service level agreement as described herein.

Systems for training and using a machine learning model are now described in more detail with reference to FIG. 6. Particularly, FIG. 6 depicts a block diagram of components of a machine learning training and inference system 600 according to one or more embodiments described herein. The system 600 performs training 602 and inference 604. During training 602, a training engine 616 trains a model (e.g., the trained model 618) to perform a task, such as identifying a backup and recovery strategy for a database. Inference 604 is the process of implementing the trained model 618 to perform the task, such as to identify a backup and recovery strategy for a database, in the context of a larger system (e.g., a system 626). All or a portion of the system 600 shown in FIG. 6 can be implemented, for example by all or a subset of the backup strategy optimization module 226 of FIG. 2, the backup strategy optimization module 226 of and/or the database profiler 316 of FIG. 3.

The training 602 begins with training data 612, which may be structured or unstructured data. According to one or more embodiments described herein, the training data 612 includes current and historical categories (e.g., size and usage patterns) for each of a plurality of databases, current and historical backup and recovery strategies for each of the plurality of databases, and current and historical performance metrics for each of the plurality of databases. The training engine 616 receives the training data 612 and a model form 614. According to one or more embodiments described herein, the model form 614 represents a base model that is untrained. The model form 614 can have preset weights and biases, which can be adjusted during training. It should be appreciated that the model form 614 can be selected from many different model forms depending on the task to be performed. For example, where the training 602 is to train a model to perform image classification, the model form 614 may be a model form of a CNN, although other types of model forms and/or algorithms can be implemented.

According to one or more embodiments described herein, the model form 614 represents an algorithm that can be trained to perform a particular task. In some embodiments, the model form 614 is an algorithm that can include, for example, supervised learning algorithms, unsupervised learning algorithm, artificial neural network algorithms, association rule learning algorithms, hierarchical clustering algorithms, cluster analysis algorithms, outlier detection algorithms, semi-supervised learning algorithms, reinforcement learning algorithms and/or deep learning algorithms. Examples of supervised learning algorithms can include, for example, AODE; Artificial neural network, such as Back-propagation, Autoencoders, Hopfield networks, Boltzmann machines, Restricted Boltzmann Machines, and/or Spiking neural networks; Bayesian statistics, such as Bayesian network and/or Bayesian knowledge base; Case-based reasoning; Gaussian process regression; Gene expression programming; Group method of data handling (GMDH); Inductive logic programming; Instance-based learning; Lazy learning; Learning Automata; Learning Vector Quantization; Logistic Model Tree; Minimum message length (decision trees, decision graphs, etc.), such as Nearest Neighbor algorithms and/or Analogical modeling; Probably approximately correct learning (PAC) learning; Ripple down rules, a knowledge acquisition methodology; Symbolic machine learning algorithms; Support vector machines; Random Forests; Ensembles of classifiers, such as Bootstrap aggregating (bagging) and/or Boosting (meta-algorithm); Ordinal classification; Information fuzzy networks (IFN); Conditional Random Field; ANOVA; Linear classifiers, such as Fisher's linear discriminant, Linear regression, Logistic regression, Multinomial logistic regression, Naive Bayes classifier, Perceptron, and/or Support vector machines; Quadratic classifiers; k-nearest neighbor; Boosting; Decision trees, such as C4.5, Random forests, ID3, CART, SLIQ, and/or SPRINT; Bayesian networks, such as Naive Bayes; and/or Hidden Markov models. Examples of unsupervised learning algorithms can include Expectation-maximization algorithm; Vector Quantization; Generative topographic map; and/or Information bottleneck method. Examples of artificial neural network can include Self-organizing maps. Examples of association rule learning algorithms can include Apriori algorithm; Eclat algorithm; and/or FP-growth algorithm. Examples of hierarchical clustering can include Single-linkage clustering and/or Conceptual clustering. Examples of cluster analysis can include K-means algorithm; Fuzzy clustering; DBSCAN; and/or OPTICS algorithm. Examples of outlier detection can include Local Outlier Factors. Examples of semi-supervised learning algorithms can include Generative models; Low-density separation; Graph-based methods; and/or Co-training. Examples of reinforcement learning algorithms can include Temporal difference learning; Q-learning; Learning Automata; and/or SARSA. Examples of deep learning algorithms can include Deep belief networks; Deep Boltzmann machines; Deep Convolutional neural networks; Deep Recurrent neural networks; and/or Hierarchical temporal memory.

According to one or more embodiments described herein, the model form 614 is a foundational model that is trained on a wide variety of generalized, unlabeled training data to perform one or more different general tasks, such as generating content (text, images, etc.), performing natural language processing, and/or the like including combinations and/or multiples thereof. In the case of the model form 614 being a foundational model, the training 602 can include tuning the foundational model (e.g., the model form 614) using the training data 612. Tuning the foundational model provides the benefits of the broad capabilities of the foundational model while enabling the foundational model to be customized using training data (e.g., the training data 612) related to a particular task or environment to which the foundational modal is then applied. In this way, the training 602 need not train a new model from scratch, which is time consuming and resource intensive.

The training 602 can be supervised learning, semi-supervised learning, unsupervised learning, reinforcement learning, and/or the like, including combinations and/or multiples thereof. For example, supervised learning can be used to train a machine learning model to classify an object of interest in an image. To do this, the training data 612 includes labeled images, including images of the object of interest with associated labels (ground truth) and other images that do not include the object of interest with associated labels. In this example, the training engine 616 takes as input a training image from the training data 612, makes a prediction for classifying the image, and compares the prediction to the known label. The training engine 616 then adjusts weights and/or biases of the model based on results of the comparison, such as by using backpropagation. The training 602 may be performed multiple times (referred to as "epochs") until a suitable model is trained (e.g., the trained model 618).

Once trained, the trained model 618 can be used to perform inference 604 to perform a task, such as to identify a backup and recovery strategy for a database. The inference engine 620 applies the trained model 618 to new data 622 (e.g., real-world, non-training data). For example, if the trained model 618 is trained to classify images of a particular object, such as a chair, the new data 622 can be an image of a chair that was not part of the training data 612. In this way, the new data 622 represents data to which the model 618 has not been exposed. The inference engine 620 makes a prediction 624 (e.g., a classification of an object in an image of the new data 622) and passes the prediction 624 to the system 626. The system 626 can, based on the prediction 624, taken an action, perform an operation, perform an analysis, and/or the like, including combinations and/or multiples thereof. In some embodiments, the system 626 can add to and/or modify the new data 622 based on the prediction 624.

In accordance with one or more embodiments, the predictions 624 generated by the inference engine 620 are periodically monitored and verified to ensure that the inference engine 620 is operating as expected. Based on the verification, additional training 602 may occur using the trained model 618 as the starting point. The additional training 602 may include all or a subset of the original training data 612 and/or new training data 612. In accordance with one or more embodiments, the training 602 includes updating the trained model 618 to account for changes in expected input data.

Various embodiments are described herein with reference to the related drawings. Alternative embodiments can be devised without departing from the scope of the present disclosure. Various connections and positional relationships (e.g., over, below, adjacent, etc.) are set forth between elements in the following description and in the drawings. These connections and/or positional relationships, unless specified otherwise, can be direct or indirect, and the present disclosure is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the present disclosure may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/ connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for optimizing a backup and recovery strategy of a database, the method comprising:
    obtaining service level agreements for the database;
    identifying, using a trained machine learning model, an initial recommended database backup and recovery strategy for the database based on the service level agreements;
    configuring a database backup of the database based on the initial recommended database backup and recovery strategy;
    monitoring a usage of one or more of the database and the database backup;
    identifying, using the trained machine learning model, a recommended change to the configuration of the database backup based at least in part on one or more of a change in the usage of one or more of the database and the database backup, a change in the service level agreements, a change in a cloud environment in which the database backup is located, and a change in available database backup and recovery strategies offered by the cloud environment; and
    updating the configuration of the database based on the recommended change.

2. The computer-implemented method of claim 1, wherein the initial recommended database backup and recovery strategy for the database is identified using a trained machine learning model.

3. The computer-implemented method of claim 2, wherein the trained machine learning model is created based on training data that includes current and historical backup and recovery strategies corresponding to each of a plurality of databases, and current and historical service level agreement metrics for each of the plurality of databases.

4. The computer-implemented method of claim 1, wherein the recommended change includes a new database backup and recovery strategy that is identified by inputting the usage of the one or more of the database and the database backup, a current database backup and recovery strategy of the database, and the service level agreements for the database into a trained machine learning model.

5. The computer-implemented method of claim 1, further comprising:
    identifying a change in the service level agreements for the database;
    identifying a change to the configuration of the database backup based on the change in the service level agreements; and
    updating the configuration of the database based on the change.

6. The computer-implemented method of claim 1, wherein the usage of one or more of the database and the database backup, the identifying the recommended change to the configuration of the database backup based on the usage of one or more of the database and the database backup, and the updating the configuration of the database based on the recommended change are iteratively repeated based on an output of a reinforcement learning algorithm.

7. The computer-implemented method of claim 1, wherein updating the configuration of the database based on the recommended change includes modifying the initial recommended database backup and recovery strategy for the database.

8. A computing system having a memory having computer readable instructions and one or more processors for executing the computer readable instructions, the computer readable instructions controlling the one or more processors to perform operations comprising:
    obtaining service level agreements for a database;
    identifying, using the trained machine learning model, an initial recommended database backup and recovery strategy for the database based on the service level agreements;
    configuring a database backup of the database based on the initial recommended database backup and recovery strategy;
    monitoring a usage of one or more of the database and the database backup;
    identifying, using the trained machine learning model, a recommended change to the configuration of the database backup based at least in part on one or more of a change in the usage of one or more of the database and the database backup, a change in the service level agreements, a change in a cloud environment in which the database backup is located, and a change in available database backup and recovery strategies offered by the cloud environment; and
    updating the configuration of the database based on the recommended change.

9. The computing system of claim 8, wherein the initial recommended database backup and recovery strategy for the database is identified using a trained machine learning model.

10. The computing system of claim 9, wherein the trained machine learning model is created based on training data that includes current and historical backup and recovery strategies corresponding to each of a plurality of databases, and current and historical service level agreement metrics for each of the plurality of databases.

11. The computing system of claim 8, wherein the recommended change includes a new database backup and recovery strategy that is identified by inputting the usage of the one or more of the database and the database backup, a current database backup and recovery strategy of the database, and the service level agreements for the database into a trained machine learning model.

12. The computing system of claim 8, wherein the operations further comprise:
 identifying a change in the service level agreements for the database;
 identifying a change to the configuration of the database backup based on the change in the service level agreements; and
 updating the configuration of the primary database based on the change.

13. The computing system of claim 8, wherein the usage of one or more of the database and the database backup, the identifying the recommended change to the configuration of the database backup based on the usage of one or more of the database and the database backup, and the updating the configuration of the database based on the recommended change are iteratively repeated based on an output of a reinforcement learning algorithm.

14. The computing system of claim 8, wherein updating the configuration of the database based on the recommended change includes modifying the initial recommended database backup and recovery strategy for the database.

15. A computer program product comprising a computer readable storage medium having program instructions embodied therewith, the program instructions executable by a processor to cause the processor to perform operations comprising:
 obtaining service level agreements for a database;
 identifying, using the trained machine learning model, an initial recommended database backup and recovery strategy for the database based on the service level agreements;
 configuring a database backup of the database based on the initial recommended database backup and recovery strategy;
 monitoring a usage of one or more of the database and the database backup;
 identifying, using the trained machine learning model, a recommended change to the configuration of the database backup based at least in part on one or more of a change in the usage of one or more of the database and the database backup, a change in the service level agreements, a change in a cloud environment in which the database backup is located, and a change in available database backup and recovery strategies offered by the cloud environment; and
 updating the configuration of the database based on the recommended change.

16. The computer program product of claim 15, wherein the initial recommended database backup and recovery strategy for the database is identified using a trained machine learning model.

17. The computer program product of claim 16, wherein the trained machine learning model is created based on training data that includes current and historical backup and recovery strategies corresponding to each of a plurality of databases, and current and historical service level agreement metrics for each of the plurality of databases.

18. The computer program product of claim 15, wherein the recommended change includes a new database backup and recovery strategy that is identified by inputting the usage of the one or more of the database and the database backup, a current database backup and recovery strategy of the database, and the service level agreements for the database into a trained machine learning model.

19. The computer program product of claim 15, wherein the operations further comprise:
 identifying a change in the service level agreements for the database;
 identifying a change to the configuration of the database backup based on the change in the service level agreements; and
 updating the configuration of the primary database based on the change.

20. The computer program product of claim 15, wherein the usage of one or more of the database and the database backup, the identifying the recommended change to the configuration of the database backup based on the usage of one or more of the database and the database backup, and the updating the configuration of the database based on the recommended change are iteratively repeated based on an output of a reinforcement learning algorithm.

* * * * *